(12) United States Patent
Pang et al.

(10) Patent No.: US 9,606,687 B2
(45) Date of Patent: Mar. 28, 2017

(54) TOUCH DISPLAY DEVICE

(71) Applicant: InnoLux Corporation, Miao-Li County (TW)

(72) Inventors: Jia-Pang Pang, Miao-Li County (TW);
I-An Yao, Miao-Li County (TW);
Charles Chien, Miao-Li County (TW);
Ming-Huang Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 67 days.

(21) Appl. No.: 14/665,216

(22) Filed: Mar. 23, 2015

(65) Prior Publication Data

US 2015/0277627 A1    Oct. 1, 2015

(30) Foreign Application Priority Data

Apr. 1, 2014   (TW) .............................. 103112173 A

(51) Int. Cl.
*G06F 3/041*   (2006.01)
*G06F 3/044*   (2006.01)

(52) U.S. Cl.
CPC .............. *G06F 3/044* (2013.01); *G06F 3/041* (2013.01); *G06F 2203/04111* (2013.01); *G06F 2203/04112* (2013.01); *G06F 2203/04113* (2013.01)

(58) Field of Classification Search
CPC ........... G06F 3/041; G06F 2203/04111; G06F 3/04112; G06F 3/04113
See application file for complete search history.

(56) References Cited

U.S. PATENT DOCUMENTS

| 8,896,573 B1 * | 11/2014 | Guard | G06F 3/044 345/174 |
| 2012/0105343 A1 * | 5/2012 | Lee | G06F 3/044 345/173 |
| 2013/0127769 A1 * | 5/2013 | Guard | G06F 3/044 345/174 |

* cited by examiner

*Primary Examiner* — Kenneth Bukowski
(74) *Attorney, Agent, or Firm* — Bacon & Thomas, PLLC

(57) ABSTRACT

A touch display device is disclosed, comprising a display module and a plurality of touch units disposed on the display module. The display module comprises a plurality of first sub-pixels, second sub-pixels, and third sub-pixels having different colors. Each of the touch units comprises two first electrode blocks arranged along a first direction, two second electrode blocks electrically connected to each other and arranged along a second direction, a bridge line electrically connected to the two first electrode blocks, wherein an angle ($\theta_1$) formed between the bridge line and the first direction is larger than 0°; and an insulating layer disposed between the bridge line and the two second electrodes.

7 Claims, 9 Drawing Sheets

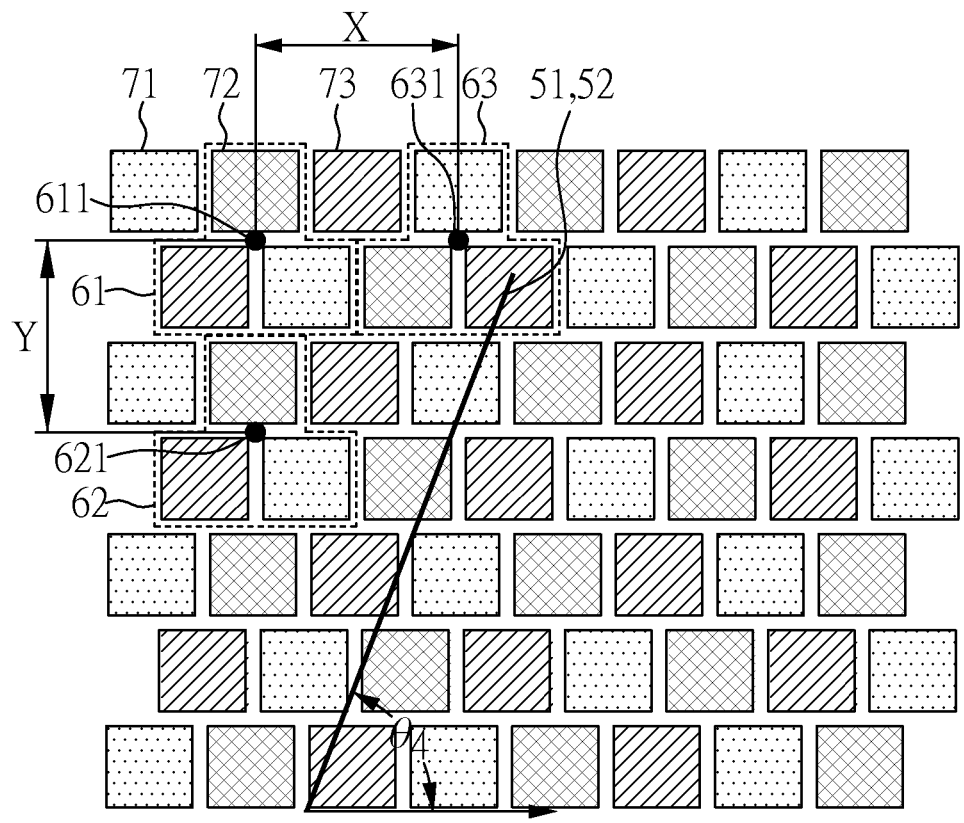
FIG. 9
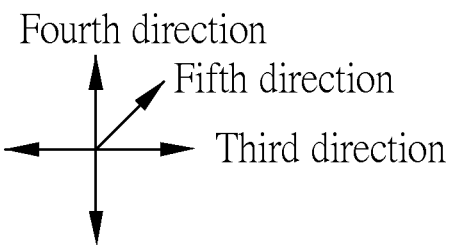

TOUCH DISPLAY DEVICE

CROSS REFERENCE TO RELATED APPLICATION

This application claims the benefits of the Taiwan Patent Application Serial Number 103112173, filed on Apr. 1, 2014, the subject matter of which is incorporated herein by reference.

BACKGROUND OF THE INVENTION

1. Field of the Invention

The present invention relates to a touch display device, and especially to a touch display device able to reduce the visibility of a metal pattern.

2. Description of Related Art

Recently, with the development trend of user-friendly operation and simplicity, touch display devices with a panel are becoming more and more widely used in life. Since the user can input signals directly by hands or other objects to access the touch display device, the user's dependence on other input devices (such as a keyboard, a mouse, a remote controller and so on) are thus reduced or even eliminated, thereby greatly facilitating the user's operation.

The touch panel technique may be divided into capacitive and resistive types according to signal generating mechanisms. A capacitive touch panel employs a transparent indium tin oxide (ITO) as a sensing electrode arranged on a transparent substrate along the directions of vertical axis and horizontal axis, and capacitance is generated between the adjacent electrodes in the different axial directions. When a conductor (such as a finger or touch pen) approaches the sensing electrode, it changes the capacitance, thereby generating the tough signal. On the other hand, a resistive touch panel comprises two electrode layers, and dot spacers are disposed between the two electrode layers to insulate the two electrode layers. The two electrode layers are electrically connected when a pressure is applied by a touch of an object, thus generating a signal representing the potential difference, which is then transferred to a controller by a circuit to process and calculate the coordinate position of the touch spot.

Generally, the touch unit of the touch panel comprises a sensing electrode array having a plurality of sensing electrodes arranged along vertical and horizontal directions, bridge metal for electrically connecting the sensing electrodes, and an insulating layer disposed therebetween. However, in the display area, the opaque bridge metal reflects the external light into human eyes. Therefore, the user may easily observe the bridge metal in the touch device, resulting in a poor visual effect of the touch panel display. In addition, as the size of the touch panel increases, manufacturers face the problem that resistance of the sensor electrode is too high to drive the touch panel.

Accordingly, what is needed is to develop a touch display device capable of reducing the visibility of the metal pattern to improve the visual quality of the touch display device, and alleviate the problem of overly high resistance.

SUMMARY OF THE INVENTION

An object of the present invention is to provide a touch display device able to efficiently reduce the visibility of the metal pattern, improve the visual quality and alleviate the problem of overly high resistance.

To achieve the above object, the present invention provides a touch display device, comprising: a display module comprising a plurality of first sub-pixels, second sub-pixels, and third sub-pixels having different colors; and a plurality of touch units disposed on the display module, wherein each of the touch units comprises: two first electrode blocks arranged along a first direction; two second electrode blocks electrically connected to each other and arranged along a second direction; a bridge line electrically connected to the two first electrode blocks, wherein an angle ($\theta_1$) formed between the bridge line and the first direction is larger than 0° and less than 90°; and an insulating layer disposed between the bridge line and the two second electrode blocks; wherein, the two adjacent bridge lines along the first direction are disposed symmetrically with respect to an axis parallel to the second direction, and the two adjacent bridge lines along the second direction are disposed symmetrically with respect to an axis parallel to the first direction.

Accordingly, compared with the conventional touch panel, since the adjacent bridge lines of the touch display device of the present invention have different inclination directions, the lights reflected by the bridge line from the external light will not incident to the human eye in the same direction. Accordingly, the user won't perceive a relatively strong reflected light at one viewing angle, while a relatively weak reflected light at the other viewing angle when watching the display panel. On the contrary, the viewer will perceive a uniform intensity of reflected light at every viewing angle. Thus, the reflected light from the bridge line will become fuzzy due to a uniform scattering, thus solving the problem of the metal visibility.

BRIEF DESCRIPTION OF THE DRAWINGS

FIG. 9 is a schematic diagram showing a triangular arrangement of three sub-pixels according to the present invention.

DETAILED DESCRIPTION OF THE PREFERRED EMBODIMENT

Hereinafter, exemplary examples of the present invention will be described in detail. However, the present invention is not limited to the examples disclosed below, but can be implemented in various forms. The following examples are described in order to enable those of ordinary skill in the art to embody and practice the present invention, and those skilled in the art will appreciate that various modifications, additions and substitutions are possible.

Embodiment 1

Figure 1:
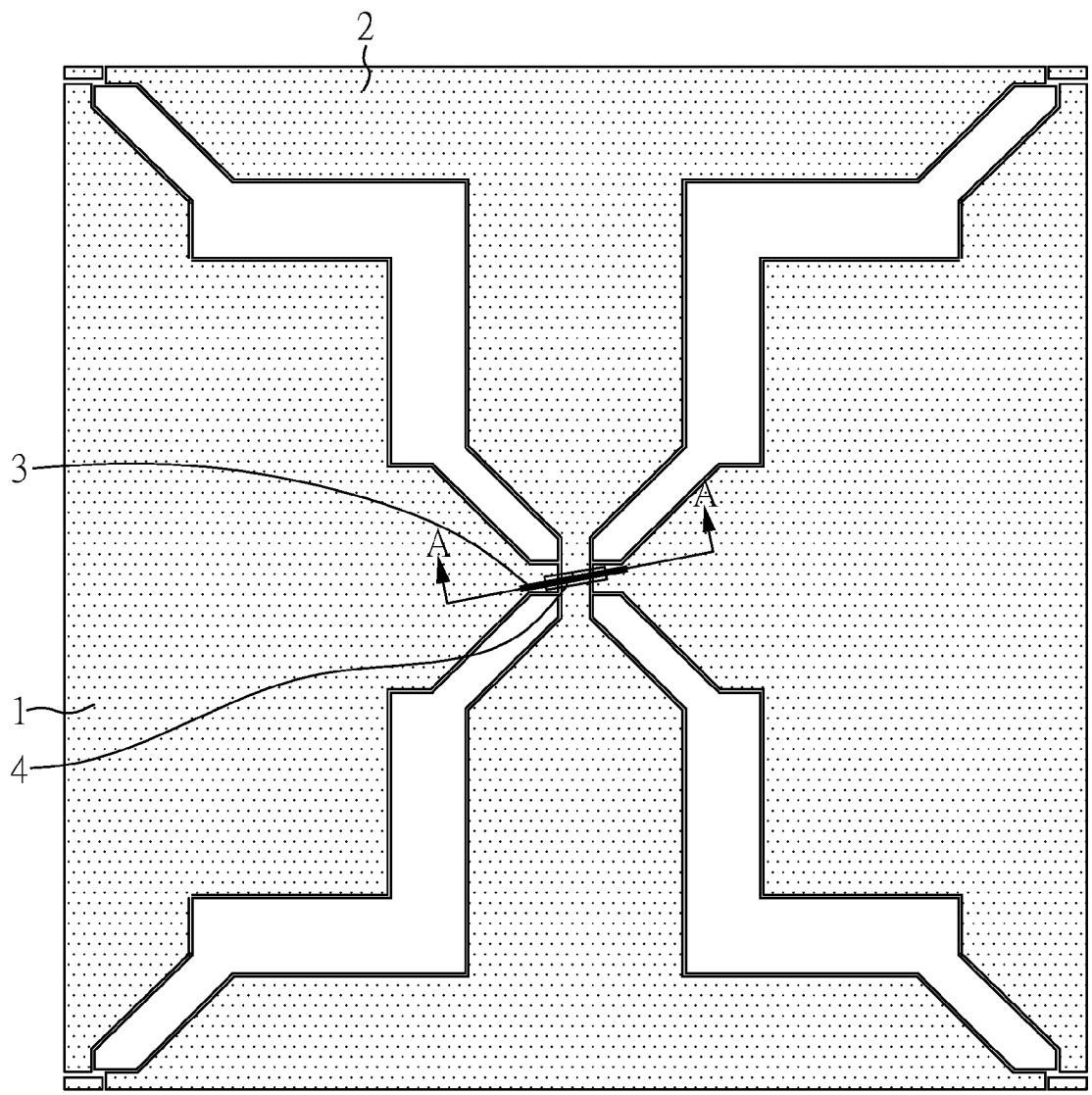
FIG. 1 shows a schematic diagram of the touch unit according to a preferred embodiment of the present invention.
Figure 1:
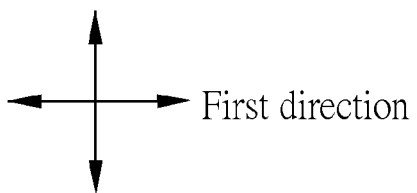
Figure 2:
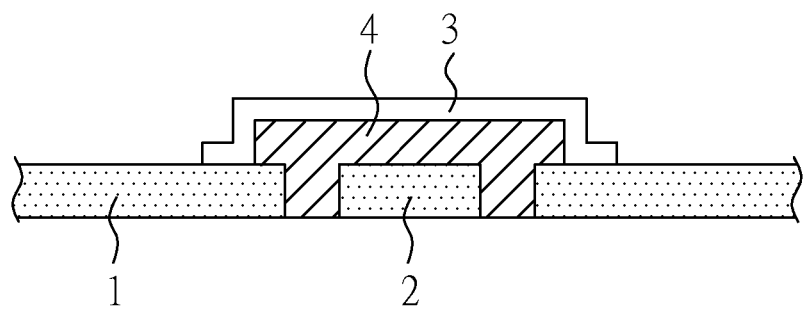
FIG. 2 is a sectional view of the touch unit in FIG. 1 along the direction AA.
Figure 4:
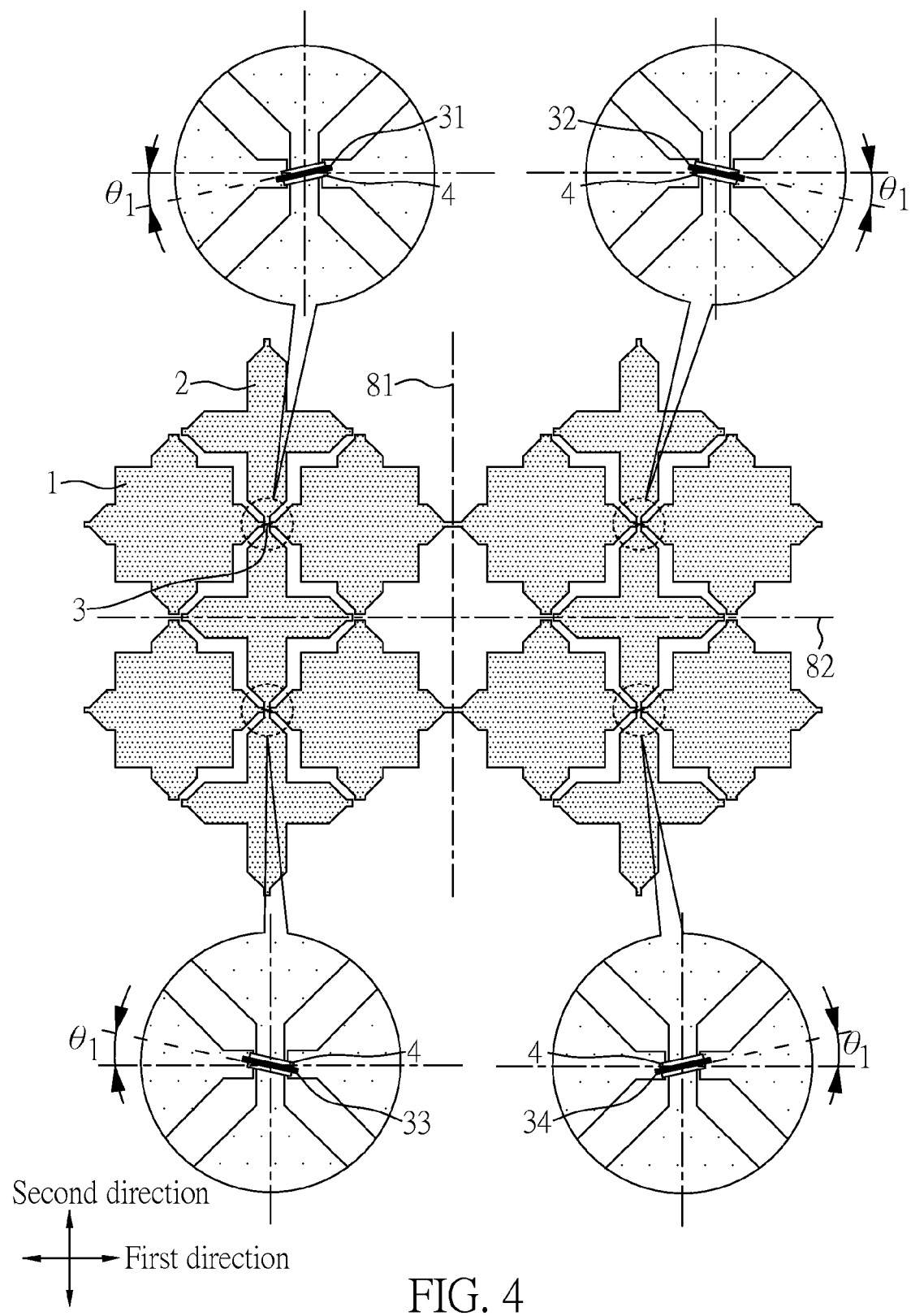
FIG. 4 shows a schematic diagram of the touch unit according to a preferred embodiment of the present invention.

FIG. 1 shows a schematic diagram of the touch unit according to a preferred embodiment of the present invention, and FIG. 2 is a sectional view of the touch unit in FIG. 1 along the direction AA. The touch unit comprises: a pair of first electrode blocks 1 arranged along a first direction; a pair of second electrode blocks 2 arranged along a second direction and disposed adjacent to the pair of the first electrode blocks 1; wherein the first direction is perpendicular to the second direction; a bridge line 3 electrically connected to the pair of the first electrode blocks 1; and an insulating layer 4 disposed between the bridge line 3 and the pair of the second electrode blocks 2. In addition, FIG. 4 shows a partially enlarged view of the four adjacent touch units, illustrating the four adjacent bridge lines 31, 32, 33, 34, respectively, wherein the two adjacent bridge lines 31, 32 or 33, 34 disposed adjacent to each other along the first direction are disposed symmetrically with respect to an axis 81 parallel to the second direction. And the two adjacent bridge lines 31, 33 or 32, 34 disposed adjacent to each other along the second direction are disposed symmetrically with respect to an axis 82 parallel to the first direction. An acute angle ($\theta_1$) formed between each of the bridge lines 31, 32, 33, 34 and the first direction is larger than 0° and less than 90°. Since the adjacent bridge lines having different inclination directions, the lights reflected by the bridge lines from the external light will not incident to the human eye in the same direction.

Accordingly, the user won't perceive a relatively strong reflected light at a one viewing angle or a relatively weak reflected light at the other viewing angle when watching the display panel. On contrary, the user will perceive a uniform intensity of the reflected light at every viewing angle. Thus, the reflected light from the bridge lines will become fuzzy due to a uniform scattering, thus solving the problem of the metal visibility.

Here, the angle $\theta_1$ is not particularly limited, and may be 20 to 70 degrees, preferably 20 to 45 degrees. Also, the arrangement of the adjacent bridge lines 31, 32, 33, 34 may be not limited to the axial arrangement, and may be for example an arrangement featuring progressive angles, an irregular arrangement, and so on. Those skilled in the art can adjust the arrangement of the bridge lines according to the practical applications.

A conductive layer may be patterned by a conventional technique (such as lithography and etching processes), to form the first electrode blocks 1 and the second electrode blocks 2. The material of the conductive layer can be a common electrode material in the related art, such as indium tin oxide (ITO), indium zinc oxide (IZO), or other transparent conductive thin film materials (transparent conductive oxide, TCO) and the like. Furthermore, the bridge lines are preferably a metal layer 3 of a single layer or a multilayer structure, and the material of the metal layer may be, for example, copper, aluminum, molybdenum, alloys thereof or combinations thereof, and less preferably a transparent conductive layer such as indium tin oxide (ITO), indium zinc oxide (IZO), or other transparent conductive thin film material (transparent conductive oxide, TCO). The width of the bridge line 3 is not particularly limited, and preferably 6-10 µm. If the width of the bridge line 3 is greater than 10 µm, the device of the present invention may have a poor effect on reducing visibility.

Furthermore, the insulating layer 4 is used to electrically insulate the pair of the first electrode block 1 and the pair of the second electrode 2, in order to avoid short circuits. In this embodiment, the top view of the insulating layer 4 is a rectangular shape, and its longitudinal direction is set corresponding to the longitudinal direction of the bridge lines 31, 32, 33, 34, but the present invention is not limited thereto, and may be adjusted according to the process conditions. The insulating layer 4 may have a single or multi-layer structure, and the material of the insulating layer 4 may be silicon oxide, silicon nitride, other transparent insulating polymer or combinations thereof.

Figure 3:
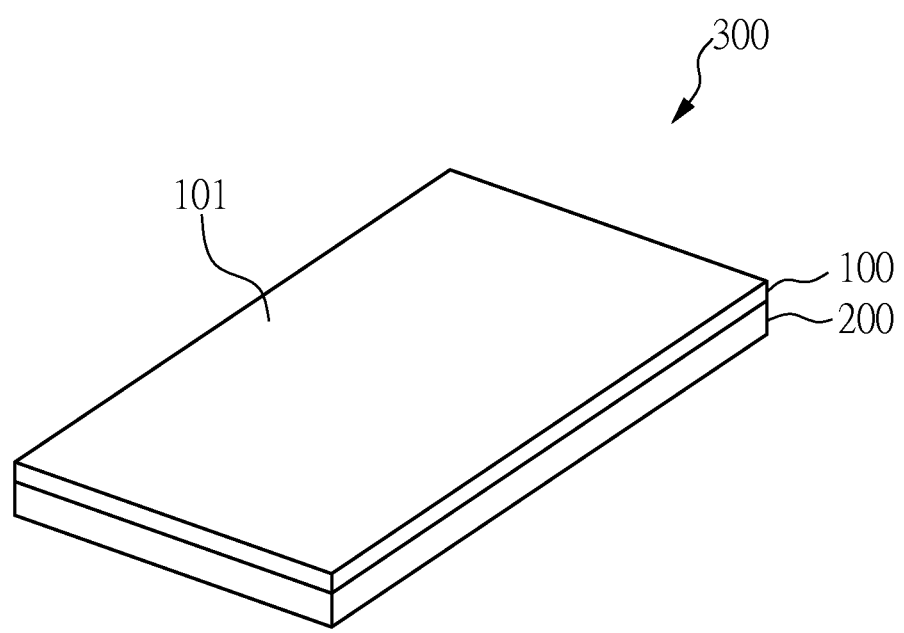
FIG. 3 shows a schematic diagram of the touch display device according to a preferred embodiment of the present invention.

As shown in FIG. 3, the touch panel comprising the above-described touch unit is applied to the display module 200. For illustrative purposes, in FIG. 3, the actually existing structures in touch panel 100 (such as a substrate, a light shading layer, an optical film, a wire layer, and a protective layer, etc.) and the display module 200 (such as a color filter substrate, an organic light-emitting diode layer, and a thin film transistor substrate, etc.) are omitted. The touch display device 300 comprises the display module 200; and the touch panel 100 disposed on a side of the display module 200; and users watch the touch display device from the touch surface 101.

In summary, the touch panel 100 may be applied to any device which has a touch panel, and is not particularly limited. The display module 200 may be a wide variety of flat panel displays, for example, a liquid crystal display, an organic light emitting diode display or an electronic paper display. The practical applications may be for example, an automobile display, an electromagnetic isolation glass, a cell phone, a solar cell, a portable LCD video game, an LCD panel for home appliances, an instrument display, an organic light-emitting diode display, an LCD monitor, a notebook, an LCD television, a plasma display, an electrode for a color filter, or combinations thereof.

Embodiment 2

Figure 5:
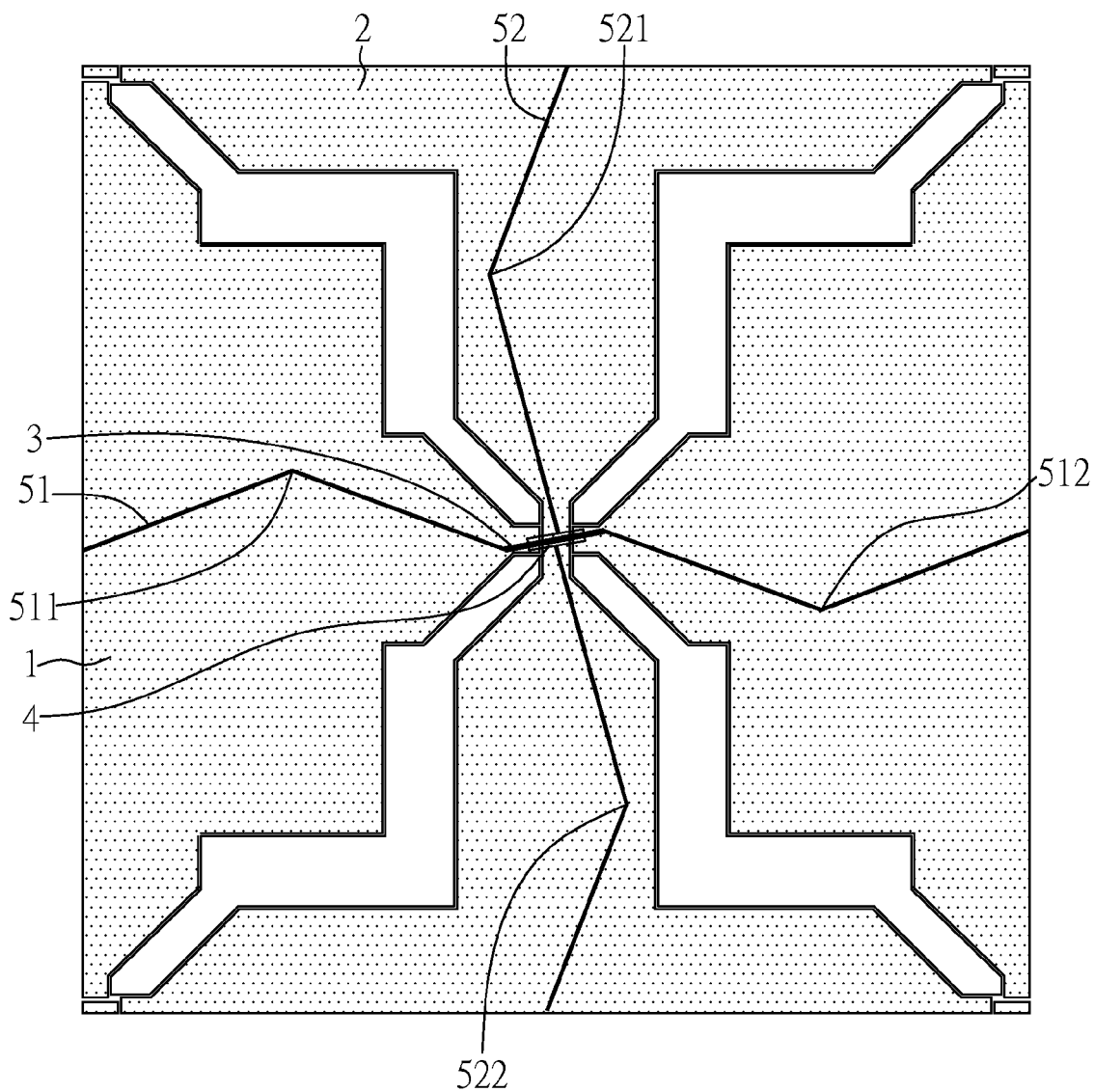
FIG. 5 shows the layout of the metal wire according to a preferred embodiment of the present invention.
Figure 5:
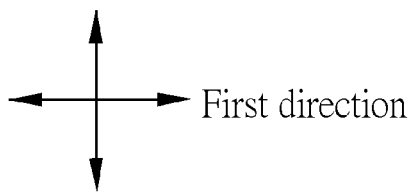

FIG. 5 is a schematic diagram of the touch unit of another embodiment, showing a plurality of metal wires disposed on the first and second electrode blocks 1, 2. Referring to FIG. 5, in addition to the above-described the first electrode block 1, the second electrode block 2, the bridge line 3, and the insulating layer 4 in Embodiment 1, a first metal wire 51 and a second metal wire 52 are further included. The first metal wire 51 is disposed on the first electrode block 1, and the second metal wire 52 is disposed on the pair of the second electrode blocks which are electrically connected to each other. The first metal wire 51 and the second metal wire 52 may be made of any conductive material, such as metal. According to the pattern of the electrode blocks, the first metal wire 51 and the second metal wire 52 may be each independently selected from the group consisting of a straight line, a curve, a polygonal line, a zigzag line, and a wavy line. In this embodiment, when the first metal wire 51 and the second metal wire 52 are a polygonal line, the first metal wire 51 has the turnings 511, 512 on the pair of the first electrode blocks 1 respectively, while the second metal wire 52 has the turnings 521, 522 on the pair of the second electrode blocks 2 respectively. A smaller number of the turnings will provide a better effect on reducing visibility. The width of the pair of the first metal wires 51 and the pair of the second metal wires 52 are not particularly limited, and preferably 2 to 4 μm. If the width of the pair of the first metal wires 51 and the pair of the second metal wires 52 are greater than 4 μm, there may be an adverse effect on reducing visibility.

Figure 6:
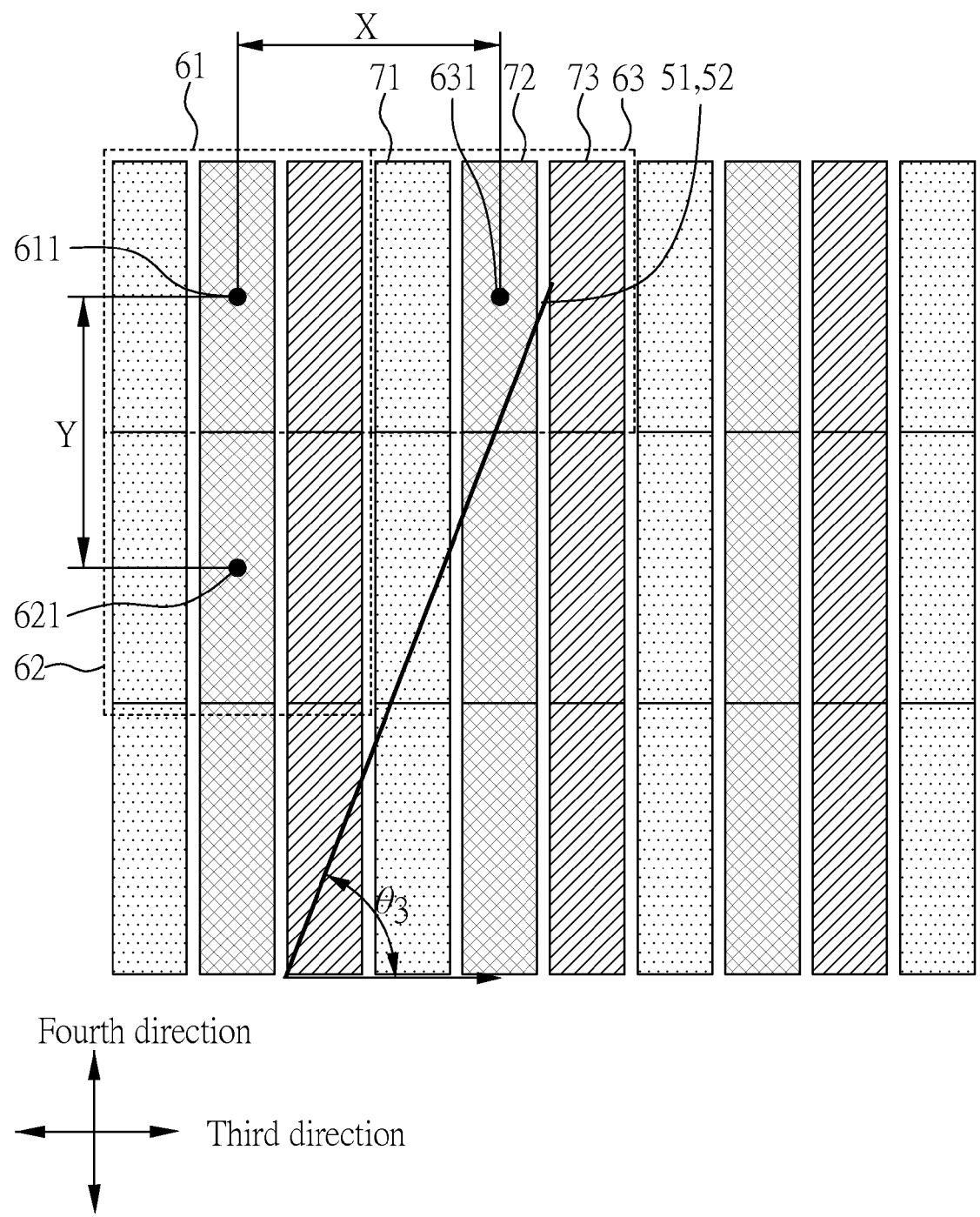
FIG. 6 is a schematic diagram showing the metal wire in FIG. 5 corresponding to the pixels in the display module.

FIG. 6 shows the schematic diagram of the first metal wires 51 and the second metal wires 52 of FIG. 5 corresponding to the pixels included in the display module 2 of FIG. 2. Each of the metal wires 51, 52 is disposed across at least three sub-pixels 71, 72, 73 on the corresponding electrode blocks 1, 2. The display module includes a plurality of pixels 61, 62, 63, and each of the pixels 61, 62, 63 includes the first sub-pixel 71, the second sub-pixel 72, and the third sub-pixel 73 arranged along the third direction, and these sub-pixels have different colors which can be independently selected from the group consisting of: red, green, blue, cyan and yellow colors, or colorless. For example, the combination (RGB) of red, green and blue colors may be used.

The arrangement of the plurality of pixels is not limited, and may be for example a stripe arrangement, a mosaic arrangement or a triangular arrangement. The color combination and arrangement of the pixels of the present invention may be appropriately selected by persons skilled in the art in accordance with the practical requirements. In this embodiment, the plurality of pixels are the combination of the red pixel 71, the green pixel 72 and blue pixel 73 arranged in a stripe arrangement.

Accordingly, one of the first and second metal wires 51, 52 forms an acute angle $\theta_3$ with respect to the third direction, wherein the acute angle ($\theta_3$) is defined by the following equation:

$$\text{Angle } (\theta_3)=[\tan^{-1}(BY/X)]\pm2° \qquad \text{[Equation]}$$

wherein, X is a distance between centers 611, 631 of the two adjacent pixels 61, 63 along the third direction, Y is a distance between centers 611, 621 of the two adjacent pixels 61, 62 along the fourth direction perpendicular to the third direction, and $0.5 \leq B \leq 1$.

Furthermore, in the equation, "±2°" refers to an error value when calculating angle caused by personal errors, environmental condition errors, instrumental errors, and so on. Typically, the acceptable error of angle in the art is in a range of ±2°, such as −0.5°, −1°, +0.5°, or +1°.

Further, each of the bridge lines 31, 32, 33, 34 described in Example 1 forms an acute angle $\theta_2$ with respect to the third direction, and the acute angle $\theta2$ may has the same definition with the acute angle $\theta_3$.

Accordingly, when the first metal wire 51 and the second metal wire 52 form an angle defined by the above equation with respect to the third direction perpendicular to the length direction of the sub-pixels 71, 72, 73, the light shading problem of the single sub-pixel can be prevented by uniformly masking each of the sub-pixels 71, 72, 73 of various colors in the plurality of pixels. When users watch the display device, the problem of color shift can be effectively solved, thereby improving the viewing quality. In addition, the first metal wire 51 and the second metal wire 52 are disposed to enhance the conductivity of the first and second electrode blocks 1, 2, and effectively reduce the overly high resistance of the first and second electrode blocks 1, 2 in the medium- or large-sized devices.

Figure 7:
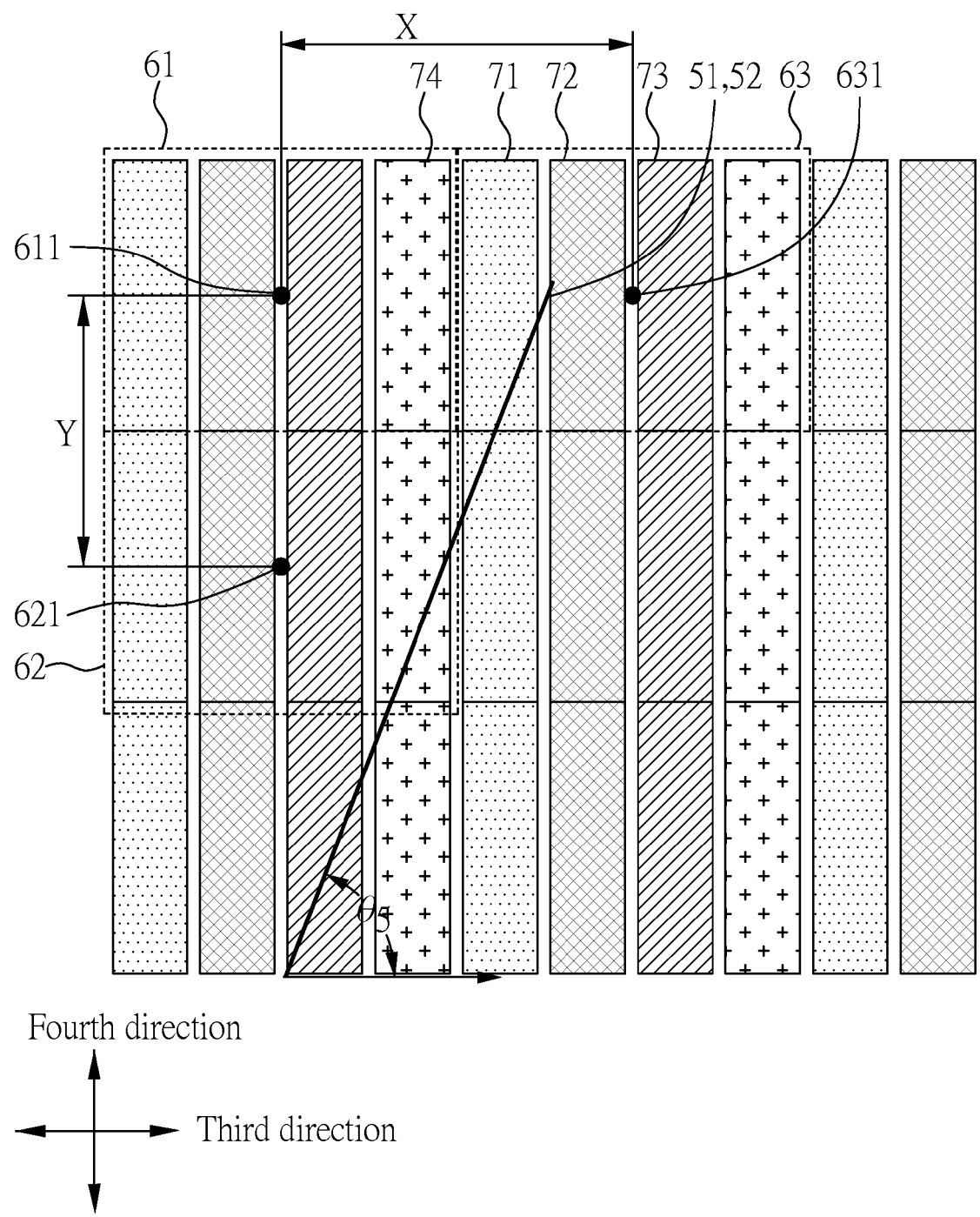
FIG. 7 is a schematic diagram showing a straight line arrangement of four sub-pixels according to the present invention.

Alternatively, referring to FIG. 7, the display module includes a plurality of pixels 61, 62, 63, and each of the pixels 61, 62, 63 includes the first sub-pixel 71, the second sub-pixel 72, the third sub-pixel 73 and the fourth sub-pixel 74 arranged along the third direction, and these sub-pixels have different colors which can be independently selected from the group consisting of: red, green, blue, cyan, yellow and white colors, or colorless. For example, the combination of red, green, blue and cyan colors (RGBC), the combination of red, green, blue and yellow colors (RGBY), or the combination of red, green, blue and white (RGBW) may be used. In this Embodiment, the plurality of pixels are arranged in a stripe arrangement. In this case, the acute angle ($\theta_5$) is defined by the following equation:

$$\text{Angle } (\theta_5)=[\tan^{-1}(BY/X)]\pm2° \qquad \text{[Equation]}$$

In this equation, X is a distance between centers 611, 631 of the two adjacent pixels 61, 63 along the third direction, Y is a distance between centers 611, 621 of the two adjacent pixels 61, 62 along the fourth direction perpendicular to the third direction, and $0.5 \leq B \leq 1$.

Figure 8:
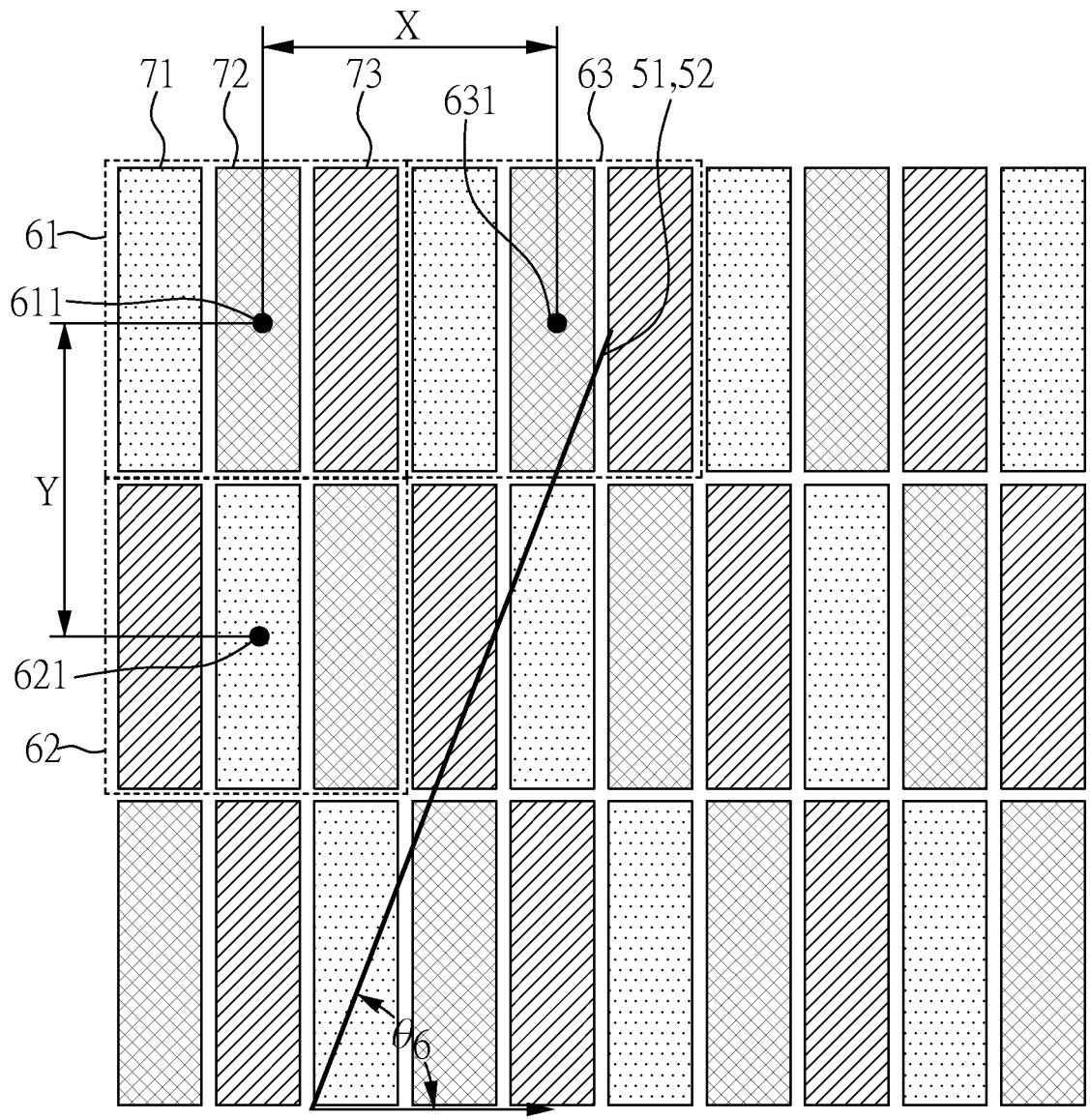
FIG. 8 is a schematic diagram showing a mosaic arrangement of three sub-pixels according to the present invention.
Figure 8:
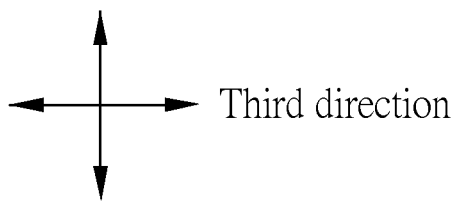

Alternatively, referring to FIG. 8, the display module includes a plurality of pixels 61, 62, 63, and each of the pixels 61, 62, 63 includes the first sub-pixel 71, the second sub-pixel 72, and the third sub-pixel 73 arranged along the third direction, and one of the first sub-pixels 71, one of the second sub-pixels 72, and one of the third sub-pixels 73 are arranged adjacent to one another along the fourth direction. In this Embodiment, the plurality of pixels are arranged in a mosaic arrangement. In this case, the acute angle ($\theta_6$) is defined by the following equation:

$$\text{Angle } (\theta_6)=[\tan^{-1}(BY/X)]\pm2° \qquad \text{[Equation]}$$

In this equation, X is a distance between centers 611, 631 of the two adjacent pixels 61, 63 along the third direction, Y is a distance between centers 611, 621 of the two adjacent pixels 61, 62 along the fourth direction, and B is 0.5.

Alternatively, referring to FIG. 9, the first sub-pixels 71, the second sub-pixels 72, and the third sub-pixels 73 are arranged adjacent to one another along a fifth direction, and the fifth direction is different from the third direction and the fourth direction. In this embodiment, the plurality of pixels are arranged in a triangular arrangement. One of the metal wires 51 and 52 is extended along a fourth direction perpendicular to the third direction, and forms an acute angle with respect to the third direction, and the acute angle ($\theta_4$) is defined by the following equation:

$$\text{Angle } (\theta_4)=[\tan^{-1}(CY/X)]\pm2° \qquad \text{[Equation]}$$

Wherein, X is a distance between centers 611, 631 of the two adjacent pixels 61, 63 along the third direction, Y is a distance between centers 611, 621 of the two adjacent pixels 61, 62 along the fourth direction, and C is 5.

Embodiment 3

Figure 10:
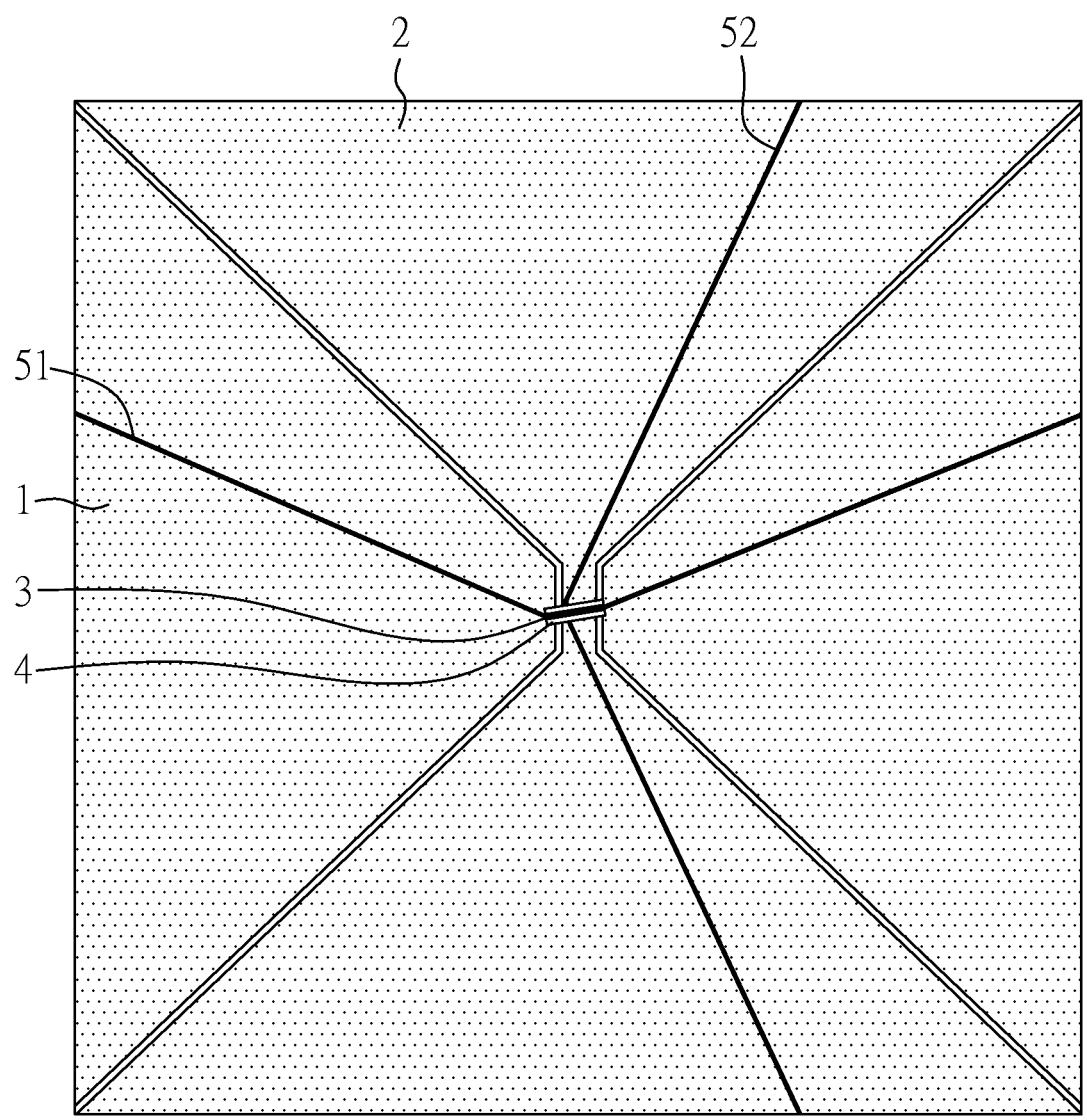
FIG. 10 shows the layout of the metal wire according to another preferred embodiment of the present invention.

FIG. 10 is a schematic view of the touch unit of another preferred embodiment, wherein the first electrode block and the second electrode block are formed into another pattern. The first metal wire 51 and the second metal wire 52 are a straight line, and has at least one turning (not shown) on each of the first and second electrode blocks. The bridge line 3 and the insulating layer 4 are the same as in above-described Embodiment 1. The descriptions for other components in Embodiments 1-2 are also applicable to the counterparts herein, and the same description will not be repeated.

While the invention has been shown and described with reference to certain exemplary examples thereof, it will be understood by those skilled in the art that various changes in form and details may be made therein without departing from the scope of the invention as defined by the appended claims.

What is claimed is:

1. A touch display device, comprising:
a display module comprising a plurality of first sub-pixels, second sub-pixels, and third sub-pixels having different colors; and
a plurality of touch units disposed on the display module, wherein each of the touch units comprises:
two first electrode blocks arranged along a first direction;
two second electrode blocks electrically connected to each other and arranged along a second direction;
a bridge line electrically connected to the two first electrode blocks, wherein an angle ($\theta_1$) formed between the bridge line and the first direction is larger than 0° and less than 90°; and
an insulating layer disposed between the bridge line and the two second electrode blocks;
wherein, two adjacent bridge lines along the first direction are disposed symmetrically with respect to an axis parallel to the second direction, and two adjacent bridge lines along the second direction are disposed symmetrically with respect to an axis parallel to the first direction; and
wherein the display module includes a plurality of pixels, and each of the pixels comprises one of the first sub-pixels, one of the second sub-pixels, and one of the third sub-pixels arranged adjacent to one another along a third direction, wherein the bridge line forms an acute angle ($\theta_2$) with respect to the third direction, and the acute angle ($\theta_2$) is defined by the following equation:

Angle ($\theta_2$)=[tan$^{-1}$($BY/X$)]±2°, wherein, X is a distance between centers of the two adjacent pixels along the third direction, Y is a distance between centers of the two adjacent pixels along a fourth direction perpendicular to the third direction, and 0.5≤B≤1.

2. The touch display device of claim 1, wherein the colors of the first sub-pixels, the second sub-pixels, and the third sub-pixels are selected from the group consisting of red, green, blue, cyan, yellow, and white colors.

3. The touch display device of claim 1, wherein each of the touch units further comprises:
at least two metal wires comprising a first metal wire and a second metal wire disposed respectively on the two first electrode blocks and the two second electrode blocks, and the first metal wire and the second metal wire are electrically insulated from each other;
wherein, each of the metal wires is disposed across at least three sub-pixels on the corresponding electrode block, and the three sub-pixels are one of the first sub-pixels, one of the second sub-pixels, and one of the third sub-pixels respectively.

4. The touch display device of claim 3, wherein the metal wire has at least one turning on the first electrode block, and the metal wire has at least one turning on the second electrode block.

5. The touch display device of claim 3, wherein one of the two metal wires forms an acute angle ($\theta_3$) with respect to the third direction, and the acute angle ($\theta_3$) is defined by the following equation:

Angle ($\theta_3$)=[tan$^{-1}$($BY/X$)]±2°, wherein, X is a distance between the centers of two adjacent pixels along the third direction, Y is a distance between the centers of two adjacent pixels along a fourth direction perpendicular to the third direction, and 0.5≤B≤1.

6. The touch display device of claim 5, wherein one of the first sub-pixels, one of the second sub-pixels, and one of the third sub-pixels are arranged adjacent to one another along the fourth direction, and in the Equation, B is 0.5.

7. The touch display device of claim 1,
wherein one of the first sub-pixels, one of the second sub-pixels, and one of the third sub-pixels are arranged adjacent to one another along a fifth direction which is different from the third direction and is different from a fourth direction perpendicular to the third direction;
wherein one of the two metal wires forms an acute angle ($\theta_4$) with respect to the third direction, and the acute angle ($\theta_4$) is defined by the following equation:

Angle ($\theta_4$)=[tan$^{-1}$($CY/X$)]±2°, wherein, X is a distance between the centers of two adjacent pixels along the third direction, Y is a distance between the centers of two adjacent pixels along the fourth direction, and C is 5.

* * * * *